US012570926B2

(12) United States Patent
Vinson et al.

(10) Patent No.: US 12,570,926 B2
(45) Date of Patent: Mar. 10, 2026

(54) FABRIC AND HOME CARE PRODUCT

(71) Applicant: The Procter & Gamble Company, Cincinnati, OH (US)

(72) Inventors: Phillip Kyle Vinson, Fairfield, OH (US); Olivier Back, Lyons (FR)

(73) Assignee: The Procter & Gamble Company, Cincinnati, OH (US)

( * ) Notice: Subject to any disclaimer, the term of this patent is extended or adjusted under 35 U.S.C. 154(b) by 657 days.

(21) Appl. No.: 17/855,870

(22) Filed: Jul. 1, 2022

(65) Prior Publication Data

US 2024/0002754 A1 Jan. 4, 2024

(51) Int. Cl.
*C11D 3/12* (2006.01)
*C11D 1/02* (2006.01)
*C11D 3/37* (2006.01)

(52) U.S. Cl.
CPC ................ *C11D 3/122* (2013.01); *C11D 1/02* (2013.01); *C11D 3/3792* (2013.01); *C11D 3/3796* (2013.01); *C11D 2111/12* (2024.01)

(58) Field of Classification Search
CPC ......... C11D 3/122; C11D 1/02; C11D 3/3792; C11D 2111/12
See application file for complete search history.

(56) References Cited

U.S. PATENT DOCUMENTS

| | | | | |
|---|---|---|---|---|
| 6,514,926 | B1 | 2/2003 | Kott | |
| 2004/0242920 | A1 | 12/2004 | Dado et al. | |
| 2019/0233761 | A1* | 8/2019 | Lo | C11D 1/29 |

FOREIGN PATENT DOCUMENTS

| | | | |
|---|---|---|---|
| CA | 2827627 | A1 | 10/2012 |
| CA | 3045698 | A1 | 7/2018 |
| WO | 2018229285 | A1 | 12/2018 |

OTHER PUBLICATIONS

Haruhiko, Miyazawa. Kondo, Yukishige. Yoshino, Noriko. "Synthesis and Solution Properties of Sulfate-Type Hybrid Surfactants with an Ethylene Spacer." J Oleo Sci. vol 54. No. 3, 167-178. (Year: 2005).*

Haruhiko, Miyazawa. Kondo, Yukishige. Yoshino, Noriko. "Synthesis and Solution Properties of Sulfate-Type Hybrid Surfactants with an Ethylene Spaces." J Oleo Sci. vol 54. No. 3, 167-178. (Year: 2005).*

PCT Search Report and Written Opinion for PCT/US2023/019334 dated Aug. 7, 2023; 10 pages.

* cited by examiner

*Primary Examiner* — Angela C Brown-Pettigrew
*Assistant Examiner* — Brittany Sharon Harris
(74) *Attorney, Agent, or Firm* — Abigail O. Idokogi; Andrew J. Mueller

(57) ABSTRACT

A fabric and home care product comprising a surfactant of formula I

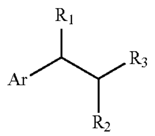

(I)

wherein Ar represents an aryl group;

$R_1$ is H or a group of formula OR wherein R is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups; $R_2$ is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups; with the proviso that $R_1$ and $R_2$ are different groups when $R_2$ is $SO_3X$, $R_1$ is H or OR with R is H when $R_2$ is H, $R_1$ is OR with R is $SO_3X$ $R_3$ is a $C_6$-$C_{16}$ aliphatic group.

6 Claims, No Drawings

FABRIC AND HOME CARE PRODUCT

FIELD OF THE INVENTION

The present application relates to fabric and home care products comprising a surfactant of formula I.

BACKGROUND OF THE INVENTION

Fabric care products often utilize surfactants. To get different benefits or even the same benefit on different surfaces, different surfactants sometimes need to be used. This lends itself to the development of new surfactants which can have the desired properties. As such, a new surfactant is needed.

SUMMARY OF THE INVENTION

Included herein is a fabric and home care product comprising a surfactant of formula I (I)

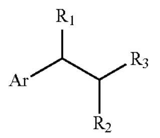

wherein Ar represents an aryl group;

$R_1$ is H or a group of formula OR wherein R is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

$R_2$ is H or $SO_3X$ wherein X is an alkali metal, alkali-earth metal or ammonium of general formula R'R"R'"R""N wherein R', R", '" and R"" are independently chosen from hydrogen or a hydrocarbyl group which can be optionally substituted and/or interrupted by one or more heteroatom containing groups; with the proviso that $R_1$ and $R_2$ are different groups when $R_2$ is $SO_3X$, $R_1$ is H or OR with R is H when $R_2$ is H, $R_1$ is OR with R is $SO_3X$ $R_3$ is a $C_6$-$C_{16}$ aliphatic group.

This and other iterations are more fully described in the remainder of the description, below.

DETAILED DESCRIPTION OF THE INVENTION

The present application is directed to fabric care products comprising novel surfactants of formula I. Formula I is (I)

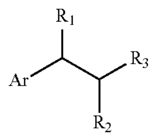

wherein Ar represents an aryl group;

$R_1$ is H or a group of formula OR wherein R is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

$R_2$ is H or $SO_3X$ wherein X is an alkali metal, alkali-earth metal or ammonium of general formula R'R"R'"R""N wherein R', R", '" and R"" are independently chosen from hydrogen or a hydrocarbyl group which can be optionally substituted and/or interrupted by one or more heteroatom containing groups;

with the provisio that $R_1$ and $R_2$ are different groups when $R_2$ is $SO_3X$, $R_1$ is H or OR with R is H when $R_2$ is H, $R_1$ is OR with R is $SO_3X$ $R_3$ is a $C_6$-$C_{16}$ aliphatic group.

The compounds of formula I have been found to provide a good toxicity and environmental profile. Furthermore, the compounds of the present invention display a good biodegradability profile, which has been found to be improved compared to the corresponding aryl-alkyl ketone sulfonates Ar—C(═O)—CH($SO_3X$)—$R_3$ of the general formula VI. Aryl-alkyl ketone sulfonates are e.g. known from WO 2018/229285 A1.

An "aryl group" (Ar) in the context of the present invention means an aromatic group, i.e. a cyclic conjugated unsaturated hydrocarbon ring having a number of delocalized π electrons following the Huckel rule; it also encompasses polycyclic aromatic groups, wherein the cyclic aromatic rings can be fused or linked by a C—C linkage; it also encompasses heteroaromatic groups, i.e. cyclic or polycyclic conjugated unsaturated rings containing one or more heteroatoms having a number of delocalized π electrons following the Huckel Rule (for example, furane, pyridine, pyrrole, as will be described in further detail below). The aryl group can optionally be further substituted by one or more functional groups.

An example for an aromatic ring as aryl group Ar is phenyl, which can optionally be further substituted by one or more functional groups. Ar may represent a substituted phenyl group of the following formula

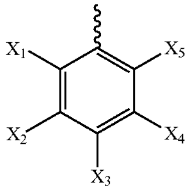

wherein $X_1$, $X_2$, $X_3$, $X_4$ and $X_5$ which can be the same or different represent hydrogen or a $C_1$-$C_{24}$ linear or branched hydrocarbon group having 1 to 24 carbon atoms which can be optionally substituted and/or interrupted by one or more heteroatoms or heteroatom containing groups, halogen, hydroxy (—OH) or alkoxy group (—OR) wherein R is a linear or branched hydrocarbon group having 1 to 24 carbon atoms which can be optionally substituted and/or interrupted by one or more heteroatoms or heteroatom containing groups, amino group (—NRR') wherein R and R' independently represent hydrogen or a linear or branched hydrocarbon group having 1 to 24 carbon atoms which can be optionally substituted and/or interrupted by one or more heteroatoms or heteroatom containing groups, acyl group (—(C═O)—R) wherein R represents hydrogen or a $C_1$-$C_{24}$ linear or branched hydrocarbon group having 1 to 24 carbon atoms which can be optionally substituted and/or interrupted by one or more heteroatoms or heteroatom containing groups, carboxyl (—COOH) or alkoxycarbonyl group (—(C═O)—OR) wherein R represents a $C_1$-$C_{24}$ linear or branched hydrocarbon group having 1 to 24 carbon atoms which can be optionally substituted and/or interrupted by one or more heteroatoms or heteroatom containing groups, carbamoyl group (—(C═O)—NRR') wherein R and R' independently represent hydrogen or a linear or branched hydrocarbon group having 1 to 24 carbon atoms which can be optionally substituted and/or interrupted by one or more heteroatoms or heteroatom containing groups, alkylsulfonyl group (—$SO_2$—R) or alkylsulfinyl group (—SO—R) or alkylthio group (—S—R) wherein R represents a $C_1$-$C_{24}$ linear or branched hydrocarbon group having 1 to 24 carbon atoms which can be optionally substituted and/or interrupted by one or more heteroatoms or heteroatom containing groups.

Examples for heteroaromatic rings as Aryl group Ar include pyridyl, furanyl, pyrrolyl, thiophenyl, pyrazolyl, imidazolyl, benzimidazolyl, indolyl, quinolinyl, isoquinolinyl, purinyl, pyrimidinyl, thiazolyl, pyrazinyl, pyridazinyl, oxazolyl and triazolyl, which may be further substituted by one or more functional groups.

For example, Ar may represent an optionally substituted 2-pyridyl, 3-pyridyl or 4-pyridyl group of formula

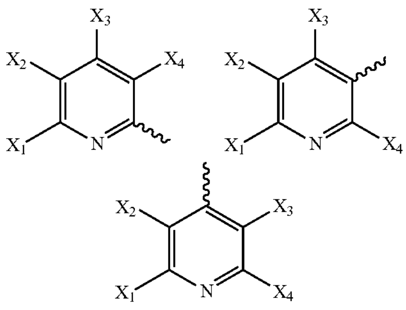

wherein $X_1$, $X_2$, $X_3$ and $X_4$ which can be the same or different have the same meaning as above described.

Ar may also represent an optionally substituted furan-2-yl or furan-3-yl group of formula

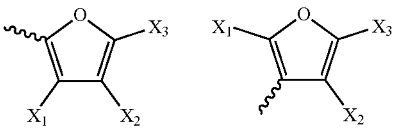

wherein $X_1$, $X_2$ and $X_3$ which can be the same or different have the same meaning as above described.

Ar may also represent an optionally substituted 1H-pyrrol-2-yl or 1H-pyrrol-3-yl group of formula:

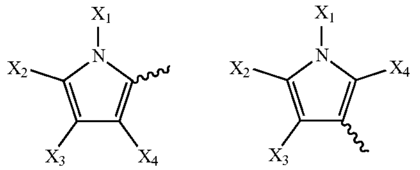

wherein $X_1$, $X_2$, $X_3$ and $X_4$ which can be the same or different have the same meaning as above described.

Ar may also represent an optionally substituted thiophen-2-yl or thiophen-3-yl group of formula:

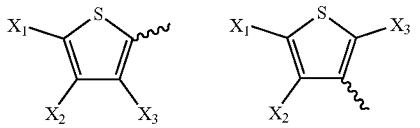

In some embodiments, substituents $X_i$ and $X_{i+1}$ beared by 2 adjacent carbons of the phenyl, the pyridyl, the furanyl, the pyrrolyl or the thiophenyl, form together an optionally substituted cyclic moiety said cyclic moiety being an aromatic, hetero-aromatic or non-aromatic group.

In a preferred embodiment of the present invention, the aryl group Ar is a phenyl group.

"$R_3$" in the context of the present invention generally represents a $C_6$-$C_{16}$ aliphatic group, preferably a $C_{10}$-$C_{16}$ aliphatic group.

The aliphatic group $R_3$ may be free of any double bond and of any triple bond. Alternatively, the aliphatic group $R_3$ may also comprise at least one C═C double bond and/or at least one C—C triple bond.

The aliphatic group $R_3$ may be linear or branched, and is preferably a linear alkyl group.

The aliphatic group $R_3$ is advantageously chosen from alkyl groups, alkenyl groups, alkanedienyl groups, alkanetrienyl groups. Preferably, it is chosen from alkyl, alkenyl and alkanetrienyl groups.

More preferably, the aliphatic group $R_3$ is chosen from alkyl and alkenyl groups, generally from $C_6$-$C_{16}$ alkyl and $C_6$-$C_{16}$ alkenyl group, preferably from $C_{10}$-$C_{16}$ alkyl and $C_{10}$-$C_{16}$ alkenyl groups.

Even more preferably, $R_3$ represents a $C_6$-$C_{16}$ alkyl group, which can be branched or linear alkyl groups, and are preferably linear alkyl groups.

The cation X in the $SO_3X$ group of the compounds of the present invention is selected from alkali metals, alkali-earth metals and ammonium.

Alkali metals suitable as group X for use in the present invention include lithium (Li), sodium (Na), potassium (K), rubidium (Rb) and cesium (Cs), with lithium, sodium and potassium being preferred alkali metals, and sodium being a particularly preferred alkali metal.

Alkali-earth metals suitable as group X for use in the present invention include beryllium (Be), magnesium (Mg), calcium (Ca), strontium (Sr) and barium (Ba), with magnesium and calcium being preferred alkali-earth metals.

Ammonium suitable as group X for use in the present invention have the general formula R'R"R'"R""N, wherein R', R", '" and R"" are independently chosen from hydrogen or a hydrocarbyl group which can be optionally substituted and/or interrupted by one or more heteroatom containing groups. The term "hydrocarbyl" as used herein comprises aryl and aliphatic groups, which can be optionally substituted and/or interrupted by one or more heteroatom containing groups. Such heteroatom containing groups comprise nitrogen containing groups, such as primary, secondary, and tertiary amines, as well as oxygen containing groups, such as hydroxyl groups and ether groups. Preferred ammonium suitable as group X for use in the present invention include e.g. $NH_4$, $N(CH_3)_4$, triethanolammonium.

Preferred compounds of formula I are defined as follows:

$R_1$ is $OSO_3X$ wherein X is defined as above and in the claims, $R_2$ is H, $R_3$ is a linear alkyl group $C_6$-$C_{16}$; and $R_1$ is OH, $R_2$ is $SO_3X$ wherein X is defined as above and in the claims, $R_3$ is a linear alkyl group $C_6$-$C_{16}$; and $R_1$ is H, $R_2$ is $SO_3X$ wherein X is defined as above and in the claims, $R_3$ is a linear alkyl group $C_6$-$C_{16}$.

More preferred compounds of formula I are defined as follows:

Ar is phenyl, $R_1$ is $OSO_3X$ wherein X is sodium, $R_2$ is H, $R_3$ is a linear alkyl group $C_6$-$C_{16}$; and Ar is phenyl, $R_1$ is OH, $R_2$ is $SO_3X$ wherein X is sodium, $R_3$ is a linear alkyl group $C_6$-$C_{16}$; and Ar is phenyl, $R_1$ is H; $R_2$ is $SO_3X$, wherein X is sodium, $R_3$ is a linear alkyl group $C_6$-$C_{16}$.

The biodegradability of the compounds of the present invention can be determined following a well-known standard protocol according to the OECD guidelines, such as for example the OECD 301F protocol. An alternative protocol developed by the inventors for the determination of the biodegradability of the inventive compounds disclosed herein is described in the examples section.

Fabric and Home Care Products

A fabric and home care product may comprise a surfactant of Formula I. The fabric and home care product may comprise from about 0.1% to about 99% by weight of the product of the surfactant of Formula I. Further, the fabric and home care product may comprise from about 1% to about 99%, about 2% to about 95%, about 3% to about 92%, from about 4% to about 90%, from about 5% to about 85%, from about 5% to about 80%, from about 5% to about 75%, from about 5% to about 70%, from about 5% to about 65%, from about 5% to about 60% from about 5% to about 55%, from about 5% to about 50%, from about 5% to about 45%, from about 5% to about 15%, from about 5% to about 25%, from about 15% to about 45%, or from about 25% to about 60%, by weight of the fabric and home care product of the surfactant of Formula I.

A fabric and home care product may include, for example, a hard surface cleaner, a hard surface treatment, a laundry detergent, an air freshener, a dish washing detergent, a fabric conditioner, a laundry additive, a rinse additive, or a combination thereof. A fabric care product may include compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

The fabric and home care product composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The fabric and home care product may be in the form of a liquid. The liquid composition may include from about 1%, 5%, 10%, 20%, 30%, or from about 40%, or from about 50%, to about 99%, or to about 95%, or to about 90%, or to about 75%, or to about 70%, or to about 60%, or to about 50%, or to about 40%, or to about 30%, or to about 20%, by weight of the composition, of water.

The composition may be in the form of a solid. The solid composition may be a powdered or granular composition. Such compositions may be agglomerated or spray-dried. Such composition may include a plurality of granules or particles, at least some of which comprise different compositions. The composition may be a powdered or granular cleaning composition, which may include a bleaching agent. The composition may be in the form of a bead or pastille, which may be made from a liquid melt. The composition may be an extruded product.

The fabric and home care product may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the composition, of water.

The unitized dose article may be a flexible, dissolvable sheet. The flexible and dissolvable solid sheet may be porous, and characterized by one or more of the following parameters:

a Percent Open Cell Content of from about 80% to 100%, preferably from about 85% to 100%, more preferably from about 90% to 100%; and/or an Overall Average Pore Size of from about 100 μm to about 2000 μm, from about 150 μm to about 1000 μm, preferably from about 200 μm to about 600 μm; and/or an Average Cell Wall Thickness of from about 5 μm to about 200 μm, preferably from about 10 μm to about 100 μm, more preferably from about 10 μm to about 80 μm; and/or a final moisture content of from about 0.5% to about 25%, preferably from about 1% to about 20%, more preferably from about 3% to about 10%, by weight of said solid sheet article; and/or a thickness of from about 0.5 mm to about 4 mm, preferably from about 0.6 mm to about 3.5 mm, more preferably from about 0.7 mm to about 3 mm, still more preferably from about 0.8 mm to about 2 mm, most preferably from about 1 mm to about 1.5 mm; and/or a basis weight of from about 50 grams/$m^2$ to about 250 grams/$m^2$, preferably from about 80 grams/$m^2$ to about 220 grams/$m^2$, more preferably from about 100 grams/$m^2$ to about 200 grams/$m^2$; and/or a density of from about 0.05 grams/$cm^3$ to about 0.5 grams/$cm^3$, preferably from about 0.06 grams/$cm^3$ to about 0.4 grams/$cm^3$, more preferably from about 0.07 grams/$cm^3$ to about 0.2 grams/$cm^3$, most preferably from about 0.08 grams/$cm^3$ to about 0.15 grams/$cm^3$; and/or a Specific Surface Area of from about 0.03 $m^2$/g to about 0.25 $m^2$/g, preferably from about 0.04 $m^2$/g to about 0.22 $m^2$/g, more preferably from about 0.05 $m^2$/g to about 0.2 $m^2$/g, most preferably from about 0.1 $m^2$/g to about 0.18 $m^2$/g.

The flexible and dissolvable sheet may comprise polyvinyl alcohols (PVA) polymer or copolymer thereof as a film-former, a structurant as well as a carrier for the surfactant(s) and optionally other active ingredients (e.g., emulsifiers, builders, chelants, perfumes, colorants, and the like). It is preferred that the PVA polymer or copolymer is present in the flexible and dissolvable sheet in an amount ranging from about 5% to about 50%, preferably from about 10% to about 40%, preferably from about 15% to about 30%, more preferably from about 20% to about 25%, by total weight of the solid sheet. In a particularly preferred embodiment of the present invention, the total amount of PVA(s) present in the flexible and dissolvable solid sheet article of the present invention is no more than 25% by total weight of such sheet article.

PVA polymers or copolymers suitable for the practice of the present invention are selected those with weight average molecular weights ranging from about 50,000 to about 400,000 Daltons, preferably from about 60,000 to about 300,000 Daltons, more preferably from about 70,000 to about 200,000 Daltons, most preferably from about 80,000 to about 150,000 Daltons. The weight average molecular weight is computed by summing the average molecular weights of each polymer raw material multiplied by their respective relative weight percentages by weight of the total weight of polymers present within the porous solid.

A flexible and dissolvable solid sheet is preferably made by first forming a wet pre-mixture containing the PVA, the surfactant(s) and optionally other active ingredients, followed by shaping the wet pre-mixture into a sheet and then drying such sheet of wet pre-mixture to form a solidified sheet article. Correspondingly, the weight average molecular weight of the PVA polymer or copolymer may affect the overall film-forming properties of the wet pre-mixture and its compatibility/incompatibility with the desired surfactants. Further, the weight average molecular weight of the PVA polymer or copolymer used herein may impact the viscosity of the wet pre-mixture, which may in turn influence various physical properties of the resulting solid sheet article so formed.

The water-soluble unit dose article may comprise a multiply water-soluble fibrous structure. The fibrous structure may comprise one or more plies that are associated with one another to form the water-soluble fibrous structure. The water-soluble fibrous structure may comprise a plurality of fibrous elements that are inter-entangled or otherwise associated with one another to form the plies, and as such, the fibrous structure. Each ply within the fibrous structure may comprise one or more layers, the layers together forming the ply. The layers may comprise the plurality of fibrous elements.

The fibrous structure may comprise at least one fabric hueing agent between the first ply and the second ply. The unit dose article may comprise surfactant. In a non-limiting example, the fibrous structure may comprise surfactant between the first ply and the second ply. In a non-limiting example, the first ply and/or the second ply and/or any other plies may comprise surfactant.

The water-soluble fibrous unit dose article 1 can be dissolved under various wash conditions, e.g., low temperature, low water and/or short wash cycles and/or cycles where consumers have been overloading the machine. The unit dose articles 1 of the present invention may comprise one or more active agents. As used herein, "active agent" refers to any ingredient that may provide a benefit, either directly or indirectly, to one or more fabrics. The water-soluble unit dose article 1 may contain insoluble materials, which are dispersible in aqueous wash conditions to a suspension mean particle size that is less than about 20 microns, or less than about 50 microns. The particles may be active containing particles. An advantage of such unit dose articles 1 of the present invention is that the unit dose articles 1 will fully dissolve in aqueous solutions such that any active agents contained within the unit dose article 1 are released into the wash liquor instead of remaining within the substrate of the unit dose article 1. Another advantage of the unit dose articles 1 of the present invention is the straightforward dosing of the unit dose article 1, such that the consumer may place one or more unit dose articles 1 within the washing machine drum without having to measure the product.

The water-soluble unit dose articles may exhibit a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein. In a preferred but not necessary embodiment of the present invention, the unit dose article 1 of the present invention has a rectangular or kite shape. Such a rectangular shape or kite shape is aesthetically pleasing and delightful to the consumers, so multiple articles of such shape can be stacked up and packaged together for sale in a container that is also characterized by a similar rectangular or kite shape.

The water-soluble unit dose articles may have basis weights of from about 500 grams/$m^2$ to about 5,000 grams/$m^2$, preferably from about 1,000 grams/$m^2$ to about 4,000 grams/$m^2$, more preferably from about 1,500 grams/$m^2$ to about 3,500 grams/$m^2$, most preferably from about 2,000 grams/$m^2$ to about 3,000 grams/$m^2$, as measured according to the Basis Weight Test Method described herein.

The composition may be in the form of a spray and may be dispensed, for example, from a bottle via a trigger sprayer and/or an aerosol container with a valve.

In addition to a surfactant of formula I, a fabric and home care product may include adjunct materials depending on the intended form and/or end use. These adjunct may include, for example, additional surfactants, conditioning actives, deposition aids, rheology modifiers, structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, organic solvents, cleaning polymer, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

The organic solvent can include an alcohol and/or a polyol. For example, the organic solvent can comprise ethanol, propanol, isopropanol, a sugar alcohol, a glycol, a glycol ether, glycerin, or a combination thereof. The organic solvent can comprise polyethylene glycol, especially low molecular weight polyethylene glycols such as PEG 200 and PEG 400; diethylene glycol; glycerol; 1,2-propanediol; polypropylene glycol including dipropylene glycol and tripropylene glycol and low molecular weight polypropylene glycols such as PPG400; or a mixture thereof.

The chelant can comprise, for example, EDDS, HEDP, GLDA, DTPA, DTPMP, DETA, EDTA, MGDA, Disodium 4,5-dihydroxybenzene-1,3-disulfonate [Tiron] or a mixture thereof. The chelant can be biodegradable. Biodegradable chelants can include, for example, GLDA, NTA, IDS, EDDG, EDDM, HIDS, HEIDA, HEDTA, DETA, or a combination thereof.

The enzyme can comprise, for example, protease, amylase, cellulase, mannanase, lipase, xyloglucanase, pectate lyase, nuclease enzyme, phosphodiesterase, or a mixture thereof.

Cleaning polymers can include, for example, those which can help clean stains or soils on clothing and/or help prevent those soils from redepositing on clothing during the wash. Examples are optionally modified polyglucans, poly(vinylpyrrolidone), poly (ethylene glycol), poly(vinyl alcohol), poly(vinylpyridine-N-oxide), poly(vinylimidazole), or a combination thereof.

The composition may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from 0.005 to 10 wt %, generally from 0.5 to 8 wt %.

The fabric and home care product of the present disclosure may comprise an additional surfactant. Additional surfactants may be useful for providing, for example, cleaning benefits. The fabric and home care product may comprise a surfactant system, which may contain one or more surfactants.

A fabric and home care product of the present disclosure may include from about 0.1% to about 99%, or from about 2% to about 80%, or from about 5% to about 75%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred anionic surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), alkyl ethoxylated carboxylates (AEC), and/or glycolipids such as rhamnolipids and/or sophorolipids. The anionic surfactants may be present in acid form, salt form, or mixtures thereof. The anionic surfactants may be neutralized, in part or in whole, for example, by an alkali metal (e.g., sodium) or an amine (e.g., monoethanolamine).

The fabric and home care product may also include a branched alkyl sulfate surfactant. The branched alkyl sulfate can comprise a 2-alkyl branched alkyl alcohol. 2-alkyl branched alcohols are positional isomers, where the location of the hydroxymethyl group (consisting of a methylene bridge (—$CH_2$-unit) connected to a hydroxy (—OH) group) on the carbon chain varies. Thus, a 2-alkyl branched alkyl alcohol is generally composed of a mixture of positional isomers. Furthermore, it is well known that fatty alcohols, such as 2-alkyl branched alcohols, and surfactants are characterized by chain length distributions. In other words, fatty alcohols and surfactants are generally made up of a blend of molecules having different alkyl chain lengths (though it is possible to obtain single chain-length cuts). Notably, the 2-alkyl primary alcohols described herein, which may have specific alkyl chain length distributions and/or specific fractions of certain positional isomers, cannot be obtained by simply blending commercially available materials. Specifically, the distribution of from about 50% to about 100% by weight surfactants having m+n=11 is not achievable by blending commercially available materials.

The branched alkyl sulfate may consist essentially of a mixture of surfactant isomers of Formula 3 and surfactants of Formula 4:

Formula 3

$$CH_3—(CH_2)_m—\underset{|}{\overset{CH_2—X}{CH}}—(CH_2)_n—CH_3;$$

$$6 \le m \le 11;$$
$$0 \le n \le 5$$

Formula 4

$$CH_3—(CH_2)_{m+n+3}—X$$

wherein from about 50% to about 100% by weight of the first surfactant are isomers having m+n=11; wherein between about 25% to about 50% of the mixture of surfactant isomers of Formula 3 have n=0; wherein from about 0.001% to about 25% by weight of the first surfactant are surfactants of Formula 4.

The surfactant system may include nonionic surfactants. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly (oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

The nonionic surfactant may have the formula $R(OC_2H_4)_nOH$, wherein R is selected from the group consisting of aliphatic hydrocarbon radicals containing from about 8 to about 16 carbon atoms and the average value of n is from about 5 to about 15. For example, the nonionic surfactant may be selected from ethoxylated alcohols having an average of about 12-14 carbon atoms in the alcohol (alkyl) portion and an average degree of ethoxylation of about 7-9 moles of ethylene oxide per mole of alcohol.

Additional non limiting examples include ethoxylated alkyl phenols of the formula $R(OC_2H_4)_nOH$, wherein R comprises an alkyl phenyl radicals in which the alkyl groups contain from about 8 to about 12 carbon atoms, and the average value of n is from about 5 to about 15, $C_{12}$-$C_{18}$ alkyl ethoxylates, such as, NEODOL® nonionic surfactants from Shell; $C_{14}$-$C_{22}$ mid-chain branched alcohols; $C_{14}$-$C_{22}$ mid-chain branched alkyl ethoxylates, $BAE_x$, wherein x is from 1 to 30. The nonionic ethoxylated alcohol surfactant herein may further comprise (a) residual alkoxylation catalyst(s), which may be considered residue from the reaction or an impurity. It may further comprise various impurities or by-products of the alkoxylation reaction. The impurities may vary depending on the catalyst used and the conditions of the reaction. Impurities include alkyl ethers, e.g., dialkyl ethers, such as, didodecyl ether, glycols, e.g., diethylene glycol, triethylene glycol, pentaethylene glycol, other polyethylene glycols.

The nonionic ethoxylated alcohol may be a narrow range ethoxylated alcohol. A narrow range ethoxylated alcohol may have the following general formula (5):

$$R-\!\!\left[OCH_2CH_2\right]_n\!\!-OH \quad (5)$$

where R is selected from a saturated or unsaturated, linear or branched, $C_8$-$C_{20}$ alkyl group and where greater than 90% of n is 0≤n≤15. In addition, the average value of n can be between about 4 to about 14, preferably about 6 to about 10, where less than about 10% by weight of the alcohol ethoxylate are ethoxylates having n<7 and between 10% and about 20% by weight of the alcohol ethoxylate are ethoxylates having n=8.

The composition may comprise an average value of n of about 10. The composition may have the following ranges for each of the following n:n=0 of up to 5%, each of n=1, 2, 3, 4, 5 of up to 2%, n=6 of up to 4%, n=7 of up to 10%, n=8 of between 12% and 20%, n=9 of between 15% and 25%, n=10 of between 15% and 30%, n=11 of between 10% and 20%, n=12 of up to 10%, and n>12 at up to 10%. The composition may have n=9 to 10 of between 30% and 70%. The composition may have greater than 50% of its composition made up of n=8 to 11.

R can be selected from a saturated or unsaturated, linear or branched, C12-C16 alkyl group, where the average value of n is between about 6 and about 10. R can also be selected from a saturated or unsaturated, linear or branched, $C_8$-$C_{20}$ alkyl group, where greater than 90% of n is 0≤n≤15, and where the average value of n is between about 5 to about 10, where less than about 20% by weight of the alcohol ethoxylate are ethoxylates having n<8. R can also be selected from a saturated or unsaturated, linear or branched, $C_8$-$C_{20}$ alkyl group, where greater than 90% of n is 0≤n≤15, and where the average value of n between about 6 to about 10, where less than about 10% by weight of the alcohol ethoxylate are ethoxylates having n<7 and between 10% and about 20% by weight of the alcohol ethoxylate are ethoxylates having n=8.

The alcohol ethoxylates described herein are typically not single compounds as suggested by their general formula (5), but rather, they comprise a mixture of several homologs having varied polyalkylene oxide chain length and molecular weight. Among the homologs, those with the number of total alkylene oxide units per mole of alcohol closer to the most prevalent alkylene oxide adduct are desirable; homologs whose number of total alkylene oxide units is much lower or much higher than the most prevalent alkylene oxide adduct are less desirable. In other words, a "narrow range" or "peaked" alkoxylated alcohol composition is desirable. A "narrow range" or "peaked" alkoxylated alcohol composition refers to an alkoxylated alcohol composition having a narrow distribution of alkylene oxide addition moles.

A "narrow range" or "peaked" alkoxylated alcohol composition may be desirable for a selected application. Homologs in the selected target distribution range may have the proper lipophilic-hydrophilic balance for a selected application. For example, in the case of an ethoxylated alcohol product comprising an average ratio of 5 ethylene oxide (EO) units per molecule, homologs having a desired lipophilic-hydrophilic balance may range from 2EO to 9EO. Homologs with shorter EO chain length (<2EO) or longer EO chain length (>9EO) may not be desirable for the applications for which a=5 EO/alcohol ratio surfactant is ordinarily selected, since such longer and shorter homologs are either too lipophilic or too hydrophilic for the applications utilizing this product. Therefore, it is advantageous to develop an alkoxylated alcohol having a peaked distribution.

The narrow range alkoxylated alcohol compositions of the disclosure may have an average degree of ethoxylation ranging from about 0 to about 15, such as, for example, ranging from about 4 to about 14, from about 5-10, from about 8-11, and from about 6-9. The narrow range alkoxylated alcohol compositions of the disclosure may have an average degree of ethoxylation of 10. The narrow range alkoxylated alcohol compositions of the disclosure may have an average degree of ethoxylation of 9. The narrow range alkoxylated alcohol compositions of the disclosure may have an average degree of ethoxylation of 5.

The ranges described above are exemplified in Table A in the Novel 1214-9 column. As shown below in Table A, samples were analyzed by LCMS ESI (−) after derivatization with DMF-$SO_3$ complex as well as by LCMS ESI (+). % Relative abundances are listed below in the table. Percent Relative Abundance is the weighted average of each ethoxymer relative to the total abundance of all ethoxymers in the sample.

TABLE A

| Moles of EO | Alfonic 1214-9 | Novel 1214-9 |
|---|---|---|
| 0 | 3.14% | 2.33% |
| 1 | 1.26% | 0% |
| 2 | 1.55% | 0% |
| 3 | 2.20% | 0% |
| 4 | 3.08% | 0.39% |
| 5 | 4% | 0.940% |
| 6 | 5.21% | 2.93% |
| 7 | 6.58% | 7.90% |
| 8 | 8.10% | 15.96% |
| 9 | 9.41% | 21.56% |
| 10 | 9.78% | 21.27% |
| 11 | 9.51% | 15.19% |
| 12 | 8.58% | 7.64% |
| 13 | 7.35% | 2.84% |
| 14 | 5.98% | 0.88% |
| 15 | 4.65% | 0.18% |
| 16 | 3.46% | 0% |
| 17 | 2.48% | 0% |
| 18 | 1.74% | 0% |
| 19 | 1.17% | 0% |
| 20 | 0.75% | 0% |

Please note that LCMS-ESI (+) is not sensitive to ethoxymers of less than 3 moles, nor free alcohol. In addition, ethoxymers between 3-5 moles are underrepresented. Typically, if the average distribution of EO is greater than 7 moles of EO, the distribution is not greatly affected by this limit of sensitivity. Additionally, LCMS-ESI (−) can underrepresent heavier ethoxymers when the distribution is very wide, as in ALFONIC samples. For this reason, the ALFONIC sample was analyzed in both+/−modes and the average was taken.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

The fabric and home care product may further comprise from 0.5% to 20%, more preferably from 0.75% to 15%, more preferably from 1% to 10%, most preferably from 1% to 5% by weight of the surfactant system of alkyl polyglucoside ("APG") surfactant. Preferably the alkyl polyglucoside surfactant is a C8-C16 alkyl polyglucoside surfactant, preferably a C8-C14 alkyl polyglucoside surfactant, preferably with an average degree of polymerization of between 0.1 and 3, more preferably between 0.5 and 2.5, even more preferably between 1 and 2. Most preferably the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

The compositions of the present disclosure may comprise a deposition aid. Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

The composition of the present invention may further comprise from about 0.01% to about 5%, preferably from about 0.05% to about 2%, more preferably from about 0.07% to about 1% by weight of the total composition of an amphiphilic polymer selected from the groups consisting of amphiphilic alkoxylated polyalkyleneimine and mixtures thereof, preferably an amphiphilic alkoxylated polyalkyleneimine.

Preferably, the amphiphilic alkoxylated polyalkyleneimine is an alkoxylated polyethyleneimine polymer comprising a polyethyleneimine backbone having average molecular weight range from 100 to 5,000, preferably from 400 to 2,000, more preferably from 400 to 1,000 Daltons and the alkoxylated polyethyleneimine polymer further comprising:

(i) one or two alkoxylation modifications per nitrogen atom by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

(ii) an addition of one C1-C4 alkyl moiety and one or two alkoxylation modifications per nitrogen atom by a polyalkoxylene chain having an average of about 1 to about 50 alkoxy moieties per modification wherein the terminal alkoxy moiety is capped with hydrogen, a C1-C4 alkyl or mixtures thereof, or (iii) a combination thereof, and wherein the alkoxy moieties comprises ethoxy (EO) and/or propoxy (PO) and/or butoxy (BO) and wherein when the alkoxylation modification comprises EO it also comprises PO or BO.

Preferred amphiphilic alkoxylated polyethyleneimine polymers comprise EO and PO groups within their alkoxylation chains, the PO groups preferably being in terminal position of the alkoxy chains, and the alkoxylation chains preferably being hydrogen capped. Hydrophilic alkoxylated polyethyleneimine polymers solely comprising ethoxy (EO) units within the alkoxylation chain could also optionally be formulated within the scope of this invention.

A preferred polyethyleneimine has the general structure of Formula (II):

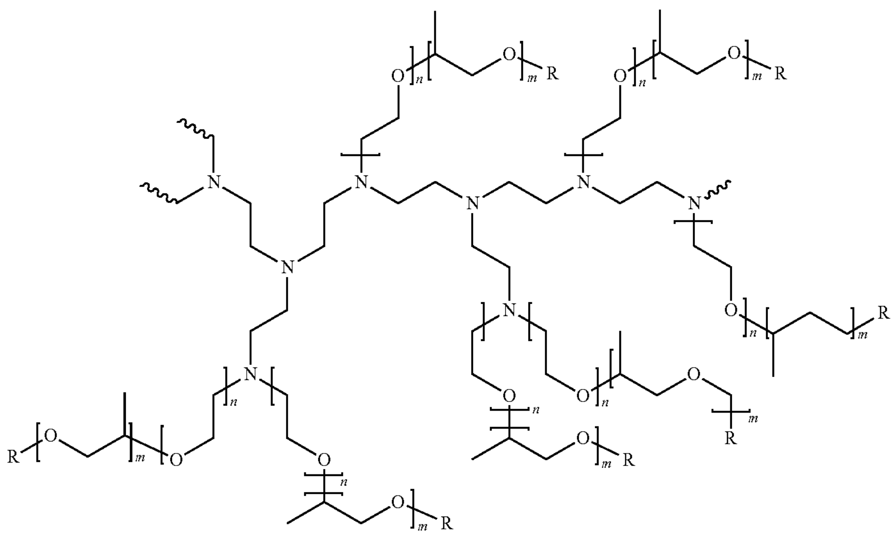

wherein the polyethyleneimine backbone has a weight average molecular weight of about 600, n of formula (II) has an average of about 10, m of formula (II) has an average of about 7 and R of formula (II) is selected from hydrogen, a $C_1$-$C_4$ alkyl and mixtures thereof, preferably hydrogen. The degree of permanent quaternization of formula (II) may be from 0% to about 22% of the polyethyleneimine backbone nitrogen atoms. The molecular weight of this polyethyleneimine preferably is between 10,000 and 15,000.

An alternative polyethyleneimine has the general structure of Formula (II) but wherein the polyethyleneimine backbone has a weight average molecular weight of about 600, n of Formula (II) has an average of about 24, m of Formula (II) has an average of about 16 and R of Formula (II) is selected from hydrogen, a $C_1$-$C_4$ alkyl and mixtures thereof, preferably hydrogen. The degree of permanent quaternization of Formula (II) may be from 0% to about 22% of the polyethyleneimine backbone nitrogen atoms. The molecular weight of this polyethyleneimine preferably is between 25,000 and 30,000.

Most preferred polyethyleneimine has the general structure of Formula (II) wherein the polyethyleneimine backbone has a weight average molecular weight of about 600, n of Formula (II) has an average of about 24, m of Formula (II) has an average of about 16 and R of Formula (II) is hydrogen. The degree of permanent quaternization of Formula (II) is 0% of the polyethyleneimine backbone nitrogen atoms. The molecular weight of this polyethyleneimine preferably is about from about 25,000 to 30,000, most preferably about 28,000.

The composition of the present invention may comprise from about 0.05% to about 2%, preferably from about 0.1% to about 1.5%, or more preferably from about 0.5% to about 1%, by weight of the total composition of a salt, preferably a monovalent, divalent inorganic salt or a mixture thereof, more preferably sodium chloride, sodium sulfate or a mixture thereof, most preferably sodium chloride.

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulfonate.

The composition of the present invention may comprise an organic solvent. Suitable organic solvents include $C_4$-14 ethers and diethers, polyols, glycols, alkoxylated glycols, $C_6$-$C_{16}$ glycol ethers, alkoxylated aromatic alcohols, aromatic alcohols, aliphatic linear or branched alcohols, alkoxylated aliphatic linear or branched alcohols, alkoxylated $C_1$-$C_5$ alcohols, $C_8$-$C_{14}$ alkyl and cycloalkyl hydrocarbons and halohydrocarbons, and mixtures thereof. Preferably the organic solvents include alcohols, glycols, and glycol ethers, alternatively alcohols and glycols. The composition comprises from 0% to less than about 50%, preferably from about 0.01% to about 25%, more preferably from about 0.1% to about 10%, or most preferably from about 0.5% to about 5%, by weight of the total composition of an organic solvent, preferably an alcohol, more preferably ethanol, a polyalkyleneglycol, more preferably polypropyleneglycol, and mixtures thereof.

Data

Compositions with surfactants of Formula I as described above are tested to determine whether there is an advantage in stain removal with their use. To look at stain removal, the Technical Stain Removal Wash Procedure is used. This method is described below.

Several different stain types are reviewed as seen in Table 1 below. The results illustrate better or equal stain removal with the use of a surfactant of Formula I (Inventive Compositions B-D, Examples Section) as compared to a sodium lauryl sulfate surfactant in a convention liquid detergent composition, like Comparative Composition A (Examples Section).

TABLE 1

| | Comparative Composition A (SRI) | Inventive Composition B (SRI) | Inventive Composition C (SRI) | Inventive Composition D (SRI) |
|---|---|---|---|---|
| Bacon Grease | 47.7 | 52.2 | 49.3 | 49.6 |
| Black Todd Clay | 74.5 | 74.2 | 74.8 | 75.3 |
| APD Burnt Butter | 49.3 | 50.2 | 49.5 | 49.7 |
| Cooked Beef | 43.8 | 45.0 | 41.6 | 41.2 |
| Grass | 61.3 | 59.8 | 55.8 | 59.6 |
| Makeup Covergirl | 25.7 | 28.8 | 27.8 | 29.0 |
| Red Wine | 48.5 | 48.9 | 48.4 | 48.5 |
| Spaghetti Sauce Ragu | 65.2 | 66.2 | 66.2 | 78.4 |
| Lipton Tea | 21.2 | 21.2 | 21.3 | 21.6 |
| ASTM Dust Sebum PCS94 | 33.3 | 30.2 | 31.9 | 31.4 |
| Choc Soy Milk | 24.5 | 26.2 | 26.6 | 29.5 |
| Discriminating Sebum PCS132 | 34.4 | 31.4 | 32.7 | 32.3 |
| Rice Starch | 41.6 | 42.2 | 39.4 | 70.9 |
| Total Stain removal average | 43.9 | 44.4 | 43.5 | 47.5 |

Following the Technical Stain Removal Wash Procedure described below. 0.66 grams of soluble unit dose detergent E-H was added to Tergotometer pots containing L of the test wash solution plus test fabrics, soiled SBL fabric and clean fabric ballast at 15° C. and 7 US grains per gallon were agitated at 208 rpm for 17 minutes and spun dry. Fabrics were then rinsed in 15° C. water at 7 US grains per gallon at 200 rpm for 5 minutes and spun dry. After the rinse, fabrics were machine dried set on high for 40 minutes before being analyzed.

Stain removal index scores for each stain are calculated as described below and are listed in Table 2 below. These results illustrate better or equal stain removal with the use of a surfactant of Formula I (Inventive Compositions F-G, Examples Section) as compared to a branched C15 alkyl sulfate surfactant in a soluble unit dose detergent, like Comparative Composition E (Examples Section).

TABLE 2

| | Comparative Composition E (SRI) | Inventive Composition F (SRI) | Inventive Composition G (SRI) | Inventive Composition H (SRI) |
|---|---|---|---|---|
| Bacon Grease | 47.0 | 45.6 | 45.3 | 45.9 |
| Black Todd Clay | 68.4 | 67.0 | 68.0 | 69.0 |
| APD Burnt Butter | 48.1 | 47.2 | 47.8 | 48.0 |
| Cooked Beef | 38.1 | 39.0 | 39.5 | 37.4 |
| Grass | 52.8 | 51.1 | 52.3 | 51.6 |
| Makeup Covergirl | 21.5 | 21.1 | 21.6 | 22.1 |
| Red Wine | 47.4 | 45.2 | 46.4 | 47.0 |
| Spaghetti Sauce Ragu | 78.9 | 76.8 | 77.6 | 77.8 |
| Lipton Tea | 18.7 | 17.0 | 17.8 | 17.8 |
| ASTM Dust Sebum PCS94 | 24.4 | 24.2 | 23.0 | 22.8 |
| Choc Soy Milk | 17.1 | 16.2 | 15.9 | 17.0 |
| Discriminating Sebum PCS132 | 27.6 | 26.5 | 25.5 | 26.5 |
| Rice Starch | 68.0 | 66.9 | 67.8 | 68.2 |
| Total Stain removal average | 42.9 | 41.8 | 42.2 | 42.4 |

Method

Technical Stain Removal Wash Procedure

The method involves the use of a tergotometer to simulate the washing of fabrics in a washing machine. Test formulations were used to wash the technical stained swatches (9 grams) together with soil SBL fabric (4 grams) and clean knitted cotton ballast (47 grams). Technical stain swatches of CW120 cotton containing stains were purchased from Advanced Product Design Co., Inc (Cincinnati, OH). The wash tests consisted of two internal and four external replicates for each stain type and treatment.

2.37 grams of liquid detergent A-D (Comparative Composition A and Inventive Compositions B-D, below) are added to tergotometer pots containing 1 L of the test wash solution plus test fabrics, soiled fabric and clean fabric ballast at 15° C. and 7 US grains per gallon were agitated at 208 rpm for 17 minutes and spun dry. Fabrics were then rinsed in 15° C. water at 7 US grains per gallon at 200 rpm for 5 minutes and spun dry. After the rinse, fabrics were machine dried set on high for 40 minutes before being analysed.

Image analysis is used to compare each stain to an unstained fabric control. Software converted images taken into standard colorimetric values and compared these to standards based on the commonly used Macbeth Color Rendition Chart, assigning each stain a colorimetric value (Stain Level). 2 internal replicates and 4 external replicates of each were prepared.

Stain removal from the swatches was measured as follows:

$$\text{Stain Removal Index } (SRI) = \frac{\Delta E_{initial} - E_{washed}}{\Delta E_{initial}} \times 100$$

| Raw Material | Comparative Composition A % wt. Active | Inventive Composition B % wt. Active | Inventive Composition C % wt. Active | Inventive Composition D % wt. Active |
|---|---|---|---|---|
| NI C24 EO9[1] | 7.08 | 7.08 | 7.08 | 7.08 |
| C12/14 Amine Oxide | 3.64 | 3.64 | 3.64 | 3.64 |
| Sodium Lauryl Sulfate | 5.18 | 2.59 | 2.59 | 2.59 |
| PAS-C10/C16[2] | | 2.59 | | |
| PAS-C14[3] | | | 2.59 | |
| PAAS-C10/C16[4] | | | | 2.59 |
| Citric acid | 1.9 | 1.9 | 1.9 | 1.9 |
| Fatty acid [5] | 2.75 | 2.75 | 2.75 | 2.75 |
| Amylase [6] | 0.01 | 0.01 | 0.01 | 0.01 |
| Protease[7] | 0.74 | 0.74 | 0.74 | 0.74 |
| Mannanase[8] | 0.0016 | 0.0016 | 0.0016 | 0.0016 |
| Sodium Tetraborate | 1.062 | 1.062 | 1.062 | 1.062 |
| Sodium Formate | 0.071 | 0.071 | 0.071 | 0.071 |
| Ethoxylated polyethyleneimine[9] | 1.6 | 1.6 | 1.6 | 1.6 |
| Ethoxylated-Propoxylated polyethyleneimine | 1.4 | 1.4 | 1.4 | 1.4 |
| Mono Ethanol Amine | 8.1 | 8.1 | 8.1 | 8.1 |
| Ethanol | 0.76 | 0.76 | 0.76 | 0.76 |

-continued

| Raw Material | Comparative Composition A % wt. Active | Inventive Composition B % wt. Active | Inventive Composition C % wt. Active | Inventive Composition D % wt. Active |
|---|---|---|---|---|
| 1,2 Propylene Glycol | 11.2 | 11.2 | 11.2 | 11.2 |
| Sodium Hydroxide | 1.53 | 1.53 | 1.53 | 1.53 |
| Water & Minors (dye, preservatives, Fragrance etc.) | Balance to 100% | Balance to 100% | Balance to 100% | Balance to 100% |

[1]NI C24 EO9 is a C12-14 alcohol ethoxylate surfactant, with an average degree of ethoxylation of 9

[2]A phenyl- alcohol sulfonate where R3 is a C10-C16 alkyl group (Surfactant of Formula I)

[3]A phenyl- alcohol sulfonate where R3 is a C14 alkyl group (Surfactant of Formula I)

[4]A phenyl-alkyl carbinol sulfate ester where R3 is a C10-C16 alkyl group (Surfactant of Formula I)

[5] Fatty acid is Topped Coconut Fatty Acid

[6] Amylase enzyme is supplied by Novozymes

[7]Protease available from DuPont-Genencor, Palo Alto, CA

[8]Mannanase is available from Novozymes, Copenhagen, Denmark

[9]PE-20 commercially available from BASF

| Raw Material | Inventive Composition 1 | Inventive Composition 2 | Inventive Composition 3 | Inventive Composition 4 |
|---|---|---|---|---|
| | % active in formulation | | | |
| Surfactant of Formula I | 5.0 | 10.0 | 15.0 | 20.0 |
| HLAS[3] | 1.5 | — | — | — |
| AES[4] | 5 | — | — | — |
| NI 2[5] | 2 | — | — | — |
| Citric acid[6] | 0.87 | 0.87 | 0.87 | 0.87 |
| Chelant[7] | 0.50 | 0.50 | 0.50 | 0.50 |
| Borate[8] | 1.19 | 1.19 | 1.19 | 1.19 |
| Misc (water, stabilizer, solvent, etc.) | Balance | Balance | Balance | Balance |

[3]High C12 (96%) Linear Alkyl Benzene Sulfonate sourced from P&G Chemicals;

[4]C12-15EO2.5S AlkylethoxySulfate where the alkyl portion of AES has a molecular weight of 211 to 218 daltons, available from P&G Chemicals;

[5]Surfonic L24-9 commercially available from Huntsman;

[6]Citrosol 502 commercially available from Archer Daniels Midland;

[7]DISSOLVINE DTPA commercially available from Nouryon.;

[8]Disodium tetraborate pentahydrate commercially sourced from Univar Solutions

The liquid compositions, like the liquid laundry detergent compositions above, can be prepared by combining the components thereof in any convenient order and by mixing, e.g., agitating, the resulting component combination to form a phase stable liquid composition. In a process for preparing such compositions, a liquid matrix can be formed containing at least a major proportion, or even substantially all, of the liquid components, e.g., surfactant, the non-surface-active liquid carriers, and other optional liquid components, with the liquid components being thoroughly admixed by imparting shear agitation to this liquid combination. For example, rapid stirring with a mechanical stirrer may usefully be employed.

While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of any solid-form materials have been added to this agitated mixture, particles of any enzyme material to be included, e.g., enzyme prills, can be incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Water Soluble Unit Dose Examples

The following are exemplary water soluble unit dose formulations. The composition can be part of a single chamber water soluble unit dose article or can be split over multiple compartments resulting in below "averaged across compartments" full article composition. The below composition is enclosed in a polyvinyl alcohol based water soluble film, more specifically a water soluble film comprising a blend of a polyvinyl alcohol homopolymer and a carboxylated anionic polyvinyl alcohol copolymer, alternatively a water soluble film comprising a carboxylated anionic polyvinyl alcohol copolymer such as M8630 or M8310 ex the MonoSol company.

Soluble Unit Dose Detergent Examples

| Raw Material | Comparative Composition E % wt. | Inventive Composition F % wt. | Inventive Composition G % wt. | Inventive Composition H % wt. |
|---|---|---|---|---|
| AES[1] | 5.1 | 5.1 | 5.1 | 5.1 |
| NI24 AO9[2] | 1.0 | 1.0 | 1.0 | 1.0 |
| C15 branched alkyl sulfate[3] | 5.2 | 2.6 | 2.6 | 2.6 |
| Mono Ethanol Amine | 8.14 | 8.14 | 8.14 | 8.14 |
| HLAS | 18.0 | 18.0 | 18.0 | 18.0 |
| Citric acid | 0.918 | 0.918 | 0.918 | 0.918 |
| TC Fatty Acid | 2.2 | 2.2 | 2.2 | 2.2 |
| C12/14 Amine Oxide | 1.2 | 1.2 | 1.2 | 1.2 |
| 1,2 Propylene Glycol | 18.7 | 18.7 | 18.7 | 18.7 |
| Chelant[4] | 0.934 | 0.934 | 0.934 | 0.934 |
| Antioxidant[5] | 0.105 | 0.105 | 0.105 | 0.105 |
| Magnesium Chloride | 0.024 | 0.024 | 0.024 | 0.024 |
| Protease[6] | 0.117 | 0.117 | 0.117 | 0.117 |
| Amylase #1 [7] | 0.005 | 0.005 | 0.005 | 0.005 |
| Mannanase[8] | 0.004 | 0.004 | 0.004 | 0.004 |
| Amylase #2[9] | 0.004 | 0.004 | 0.004 | 0.004 |
| NaHSO3 | 0.117 | 0.117 | 0.117 | 0.117 |
| Antifoam[10] | 0.087 | 0.087 | 0.087 | 0.087 |
| PAS-C10/C16[11] | 0.000 | 2.600 | 0.000 | 0.000 |
| PAS-C14[12] | 0.000 | 0.000 | 2.600 | 0.000 |
| PAAS-C10/C16[13] | 0.000 | 0.000 | 0.000 | 2.600 |
| Water & Minors (dye, preservatives etc.) | Balance | Balance | Balance | Balance |

[1]AES is an C12-15E02.5S AlkylethoxySulfate where the alkyl portion of AES includes from about 13.9 to 14.6 carbon atoms with an average degree of ethoxylation equal to 2.5

[2]NI C24 EO9 is a C12-14 alcohol ethoxylate, with an average degree of ethoxylation of 9

[3]C15 branched alkyl sulfate is alkyl sulphate anionic surfactant based on C15 starting alcohol according to the invention as disclosed in US20210380902

[4]Chelant is N,N-Dicarboxymethyl glutamic acid

[5]Antioxidant is 3,5-bis(1,1-dimethylethyl)-4-hydroxy-benzenepropanoic acid, methyl ester (commercially available under the tradename RALOX ® 35 from Raschig USA, Arlington, Tex., United States)

[6]Protease available from DuPont-Genencor, Palo Alto, CA.

[7] Amylase #1 is available from Novozymes

[8]Mannanase available from Novozymes, Copenhagen, Denmark

[9]Amylase #2 is available from DuPont-Genencor, Palo Alto, CA.

[10]Antifoam composition was obtained from Dow Corning, Midland, Mich. under the trade name AF8017

[11]A phenyl- alcohol sulfonate where R3 is a C10-C16 alkyl group (Surfactant of Formula I)

[12]A phenyl- alcohol sulfonate where R3 is a C14 alkyl group (Surfactant of Formula I)

[13]A phenyl-alkyl carbinol sulfate ester where R3 is a C10-C16 alkyl group (Surfactant of Formula I)

| Ingredients | Inventive SUD Composition 1 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| Surfactant of Formula I | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanase enzyme (wt % active protein) | 0.005 |
| Mannanase enzyme (wt % active protein) | 0.003 |
| Ethoxylated polyethyleneimine** | 1.6 |
| Amphiphilic graft copolymer*** | 2.6 |
| Zwitterionic polyamine**** | 1.8 |
| Anionic polyester terephthalate***** | 0.6 |

-continued

| Ingredients | Inventive SUD Composition 1 (wt %) |
|---|---|
| HEDP chelant | 2.2 |
| Brightener 49 | 0.4 |
| Silicone anti-foam | 0.3 |
| Hueing dye | 0.05 |
| 1,2 PropaneDiol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| K2SO3 | 0.4 |
| MgCl2 | 0.3 |
| water | 10.8 |

-continued

| Ingredients | Inventive SUD Composition 1 (wt %) |
|---|---|
| Hydrogenated castor oil | 0.1 |
| Perfume | 2.1 |
| Aesthetic dye & Minors | Balance to 100 |
| pH (10% product concentration in demineralized water at 20° C.) | 7.4 |

*Nuclease enzyme is as claimed in co-pending European application 19219568.3

**Lutensol FP620 ex BASF-ethoxylated polyethyleneimine (PEI600 EO20)

***polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

****Lutensit Z96 (zwitterionic polyamine ex BASF-zwitterionic hexamethylene diamine according to below formula: 100% quaternized and about 40% of the polyethoxy (EO24) groups are sulfonated).

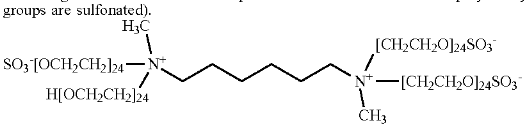

*****Texcare SRA300 ex Clariant

The following is a multi-compartment water soluble unit dose laundry article comprising a larger bottom compartment while having two smaller compartments in a side by side configuration superposed on top of the bottom compartment, following the Ariel 3-in-1 Pods design, as commercially available in the UK in January 2020. The below compositions are enclosed in a polyvinyl alcohol based water soluble outer film, more specifically a water soluble film comprising a blend of a polyvinylalcohol homopolymer and a carboxylated anionic polyvinylalcohol copolymer, and a water soluble middle film comprising a blend of polyvinyl alcohol homopolymers, alternatively a blend of a polyvinyl alcohol homopolymer and a carboxylated anionic polyvinyl alcohol copolymer.

| Ingredients | Full article Composition (wt %) | Bottom compartment Composition (wt %) | Top compartment Composition 1 (wt %) | Top compartment Composition 2 (wt %) |
|---|---|---|---|---|
| Volume | 25.5 ml | 22.3 ml | 1.6 ml | 1.6 ml |
| Fatty alcohol ethoxylate non-ionic surfactant, $C_{12-14}$ average degree of ethoxylation of 7 | 3.5 | 3.7 | 2.6 | 1.6 |
| Lutensol XL100 | 0.4 | 0.5 | — | — |
| Linear $C_{11-14}$ alkylbenzene sulphonate | 24.2 | 24.9 | 18.9 | 19.4 |
| Surfactant of Formula I | 12.3 | 12.6 | 9.7 | 9.7 |
| Citric acid | 0.7 | 0.7 | 0.5 | 0.5 |
| Palm Kernel Fatty acid | 5.2 | 5.4 | 4.1 | 4.1 |
| Nuclease enzyme* (wt % active protein) | 0.009 | 0.011 | — | — |
| Protease enzyme (wt % active protein) | 0.05 | 0.06 | — | — |
| Amylase enzyme (wt % active protein) | 0.004 | 0.005 | — | — |
| Xyloglucanase enzyme (wt % active protein) | 0.005 | — | 0.073 | — |
| Mannanase enzyme (wt % active protein) | 0.003 | 0.003 | — | — |
| Lipase enzyme (wt % active protein) | 0.012 | — | 0.187 | — |
| Ethoxylated polyethyleneimine** | 1.5 | 1.6 | 1.2 | 1.2 |
| Amphiphilic graft copolymer*** | 2.0 | 2.3 | — | — |
| Zwitterionic polyamine**** | 1.8 | 1.9 | 1.4 | 1.4 |
| Anionic polyester terephthalate***** | 0.4 | — | — | 5.8 |
| HEDP chelant | 2.2 | 2.2 | 1.7 | 1.7 |
| Brightener 49 | 0.3 | 0.4 | 0.01 | 0.01 |
| Silicone anti-foam | 0.3 | 0.3 | — | — |
| Hueing dye | 0.04 | — | 0.69 | — |
| 1,2 PropaneDiol | 13.6 | 12.8 | 11.3 | 26.4 |
| Glycerine | 6.0 | 5.0 | 17.3 | 8.3 |
| DPG (DiPropyleneGlycol) | 0.8 | 0.8 | 0.6 | 0.6 |
| TPG (TriPropyleneGlycol) | 0.06 | 0.06 | — | — |
| Sorbitol | 0.6 | 0.05 | 8.8 | — |
| Monoethanolamine | 10.0 | 10.4 | 7.9 | 8.0 |
| K2SO3 | 0.4 | 0.4 | 0.04 | 0.4 |
| MgCl2 | 0.3 | 0.3 | 0.2 | 0.2 |
| water | 10.9 | 10.9 | 11.8 | 9.9 |
| Hydrogenated castor oil | 0.1 | 0.1 | — | 0.1 |

-continued

| Ingredients | Full article Composition (wt %) | Bottom compartment Composition (wt %) | Top compartment Composition 1 (wt %) | Top compartment Composition 2 (wt %) |
|---|---|---|---|---|
| Perfume | 1.6 | 1.9 | — | — |
| Aesthetic dye & Minors (incl. preservative) | Balance to 100 | Balance to 100 | Balance to 100 | Balance to 100 |
| pH (10% product concentration in demineralized water at 20° C.) | 7.4 | 7.4 | 7.4 | 7.4 |

*Nuclease enzyme is as claimed in co-pending European application 19219568.3

**Lutensol FP620 ex BASF-ethoxylated polyethyleneimine (PEI600 EO20)

***polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

****Lutensit Z96 (zwitterionic polyamine ex BASF-zwitterionic hexamethylene diamine according to below formula: 100% quaternized and about 40% of the polyethoxy (EO24) groups are sulfonated).

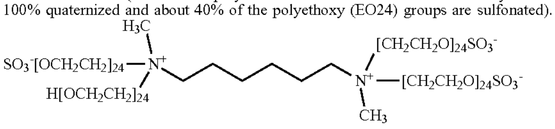

*****Texcare SRA300 ex Clariant

Fiber Based Water Soluble Unit Dose Examples

A fibrous water soluble unit dose containing a first layer of fibrous elements can be spun using a first spinning beam and collected on a forming belt. The forming belt having the first layer of fibers then passes under a second spinning beam that is modified with a particle addition system. The particle addition system is capable of substantially injecting particles toward a landing zone on the forming belt that is directly under the fibrous elements from the second spinning beam. Suitable particle addition systems may be assembled from a particle feeder, such as a vibratory, belt or screw feeder, and an injection system, such as an air knife or other fluidized conveying system. In order to aid in a consistent distribution of particles in the cross direction, the particles are preferably fed across about the same width as the spinning die to ensure particles are delivered across the full width of the composite structure. Preferably, the particle feeder is completely enclosed with the exception of the exit to minimize disruption of the particle feed. The co-impingement of particles and fibrous elements on the forming belt under the second spinning beam creates a composite structure where the particle packing is dilated and fibers substantially interpenetrate the inter-particle porosity.

The chart below sets forth non-limiting examples of dried fiber compositions, which can be used to make the fibrous elements. To make the fibrous elements, an aqueous solution, preferably having about 45% to 60% solids content, is processed through one or more spinning beams. A suitable spinning beam comprises a capillary die with attenuation airflow, along with drying airflow suitable to substantially dry the attenuated fibers before their impingement on the forming belt.

| Component | F1 | F2 | F3 | F4 | F5 | F6 |
|---|---|---|---|---|---|---|
| LAS | 48.5 | 43.1 | 59.2 | 21.0 | 47.2 | 51.8 |
| AS | 0.0 | 21.6 | 0.0 | 42.0 | 23.6 | 12.9 |
| Surfactant of Formula I | 16.2 | 0.0 | 0.0 | 0.0 | 0.0 | 0.0 |
| PEG-PVAc | 0.0 | 0.0 | 5.9 | 3.2 | 0.0 | 0.0 |
| PVOH | 32.3 | 29.3 | 28.5 | 27.5 | 23.7 | 29.3 |
| PEO | 0.0 | 3.0 | 3.2 | 3.2 | 2.5 | 3.0 |
| Moist + misc. | 3.0 | 3.0 | 3.2 | 3.1 | 3.0 | 3.0 |
| Total | 100 | 100 | 100 | 100 | 100 | 100 |

The chart below sets forth non-limiting examples of particle compositions. Particles may be made by a variety of suitable processes including milling, spray-drying, agglomeration, extrusion, prilling, encapsulation, pastillization, and any combination thereof. One or more particles may be mixed together before adding.

Particle (P) Compositions, mass %:

| Component | P1 | P2 | P3 | P4 | P5 | P6 | P7 | P8 | P9 | P10 | P11 |
|---|---|---|---|---|---|---|---|---|---|---|---|
| LAS | 0.0 | 0.0 | 7.6 | 9.5 | 8.1 | 10.8 | 4.4 | 17.2 | 13.7 | 19.2 | 20.8 |
| AS | 19.2 | 0.0 | 0.0 | 0.0 | 0.0 | 0.0 | 0.0 | 0.0 | 0.0 | 0.0 | 1.1 |
| Surfactant of Formula I | 4.8 | 45.0 | 26.4 | 21.6 | 24.6 | 21.6 | 26.3 | 34.3 | 27.4 | 25.7 | 26.6 |
| Sodium Carb. | 18.0 | 35.0 | 19.2 | 15.3 | 15.1 | 10.0 | 14.2 | 21.6 | 21.7 | 20.6 | 22.2 |
| Zeolite-A | 54.2 | 0.0 | 24.4 | 32.0 | 49.1 | 51.8 | 49.9 | 0.0 | 0.0 | 0.0 | 0.0 |
| Chelant | 0.0 | 0.0 | 0.0 | 0.0 | 0.0 | 0.0 | 0.0 | 0.0 | 0.0 | 3.5 | 0.0 |
| PE20 | 0.0 | 0.0 | 10.4 | 3.7 | 0.0 | 3.5 | 0.0 | 3.5 | 1.6 | 3.4 | 3.4 |
| Pluronic F38 | 0.0 | 0.0 | 0.0 | 0.0 | 0.0 | 0.0 | 1.8 | 0.0 | 0.0 | 0.0 | 0.0 |
| Disp. Polymer | 0.0 | 0.0 | 0.0 | 0.0 | 0.0 | 0.0 | 0.0 | 0.0 | 16.5 | 8.1 | 8.4 |
| PEG4k | 0.8 | 0.0 | 0.0 | 8.2 | 0.0 | 0.0 | 0.0 | 0.0 | 0.0 | 0.0 | 0.0 |

-continued

| Component | P1 | P2 | P3 | P4 | P5 | P6 | P7 | P8 | P9 | P10 | P11 |
|---|---|---|---|---|---|---|---|---|---|---|---|
| Silica | 0.0 | 15.0 | 8.2 | 6.7 | 0.0 | 0.0 | 0.0 | 20.2 | 14.5 | 16.4 | 12.3 |
| PVOH + PEO | 0.0 | 0.0 | 0.0 | 0.0 | 0.0 | 0.0 | 0.0 | 0.0 | 0.0 | 0.0 | 1.7 |
| Moist + misc. | 3.0 | 5.0 | 3.8 | 3.0 | 3.1 | 2.3 | 3.3 | 3.2 | 4.6 | 3.1 | 3.5 |
| Total | 100 | 100 | 100 | 100 | 100 | 100 | 100 | 100 | 100 | 100 | 100 |

Resulting products are exemplified in the chart below, providing structural detail for product chasses by fiber and particle components, with the net chassis composition for the product. Note that other product adjunct materials such as perfume, enzymes, suds suppressor, bleaching agents, etc. may be added to a chassis.

Product Chasses (C)

| Chassis | C1 | C2 | C3 | C4 | C5 | C6 | C7 | C8 | C9 | C10 |
|---|---|---|---|---|---|---|---|---|---|---|
| Fiber type | F1 | F2 | F2 | F2 | F2 | F2 | F2 | F2 | F6 | F2 |
| Fiber wt % | 25% | 25% | 25% | 28% | 17% | 27% | 26% | 21% | 22% | 27% |
| Particle type | P1 | P1 | P2 | P3 | P3 | P4 | P5 | P6 | P7 | P8 |
| Particle wt % | 75% | 75% | 75% | 72% | 83% | 73% | 74% | 79% | 78% | 73% |
| Basis wt, gsm | 3103 | 3104 | 2125 | 2477 | 4070 | 2900 | 2580 | 2706 | 3047 | 2900 |
| Formula, g/dose: | | | | | | | | | | |
| LAS | 2.5 | 2.2 | 1.5 | 3.0 | 3.6 | 3.6 | 2.9 | 3.1 | 3.0 | 4.2 |
| AS | 2.5 | 3.6 | 0.8 | 1.0 | 1.0 | 1.1 | 1.0 | 0.8 | 1.0 | 1.1 |
| Surfactant of Formula I | 2.0 | 1.2 | 4.7 | 3.0 | 5.9 | 3.0 | 3.1 | 3.1 | 3.7 | 3.8 |
| Sodium Carb. | 2.8 | 2.8 | 3.7 | 2.1 | 4.3 | 2.1 | 1.9 | 1.4 | 1.4 | 3.0 |
| Zeolite-A | 8.4 | 8.4 | 0.0 | 2.8 | 5.5 | 4.5 | 6.2 | 7.5 | 7.5 | 0.0 |
| Silica | 0.0 | 0.0 | 1.6 | 1.0 | 2.0 | 1.0 | 0.0 | 0.0 | 0.0 | 2.3 |
| PEG4k | 0.1 | 0.1 | 0.0 | 0.0 | 0.0 | 1.1 | 0.0 | 0.0 | 0.0 | 0.0 |
| PE20 | 0.0 | 0.0 | 0.0 | 1.5 | 2.3 | 0.5 | 0.0 | 0.3 | 0.0 | 0.2 |
| Pluronic F38 | 0.0 | 0.0 | 0.0 | 0.0 | 0.0 | 0.0 | 0.0 | 0.0 | 0.3 | 0.0 |
| Disp polymer | 0.0 | 0.0 | 0.0 | 0.0 | 0.0 | 0.0 | 0.0 | 0.0 | 0.0 | 2.3 |
| PVOH + PEO | 1.7 | 1.7 | 1.1 | 1.5 | 1.4 | 1.7 | 1.4 | 1.2 | 1.5 | 1.7 |
| moist & misc | 0.5 | 0.5 | 0.6 | 0.5 | 0.8 | 0.5 | 0.5 | 0.4 | 0.6 | 0.5 |
| Total chassis | 20.5 | 20.5 | 14.0 | 16.4 | 26.8 | 19.1 | 17.0 | 17.8 | 19.0 | 19.1 |

LAS is linear alkylbenzenesulfonate having an average aliphatic carbon chain length $C_{11}$-$C_{12}$ supplied by Stepan, Northfield, Illinois, USA or Huntsman Corp. HLAS is acid form.

AS is a $C_{12-14}$ sulfate, supplied by Stepan, Northfield, Illinois, USA, and/or a mid-branched alkyl sulfate.

Dispersant Polymer (Disp. Polymer) is molecular weight 70,000 and acrylate:maleate ratio 70:30, supplied by BASF, Ludwigshafen, Germany.

PEG-PVAc polymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units. Available from BASF (Ludwigshafen, Germany).

Ethoxylated Polyethylenimine (PE20) is a 600 g/mol molecular weight polyethylenimine core with 20 ethoxylate groups per —NH. Available from BASF (Ludwigshafen, Germany).

Liquid Hand Dishwashing Detergent Formulation

The following is an exemplary liquid hand dishwashing detergent formulation. The formulation can be made through standard mixing of the individual components.

| As 100% active | Inventive Dish Formula 1 | Inventive Dish Formula 2 | Inventive Dish Formula 3 |
|---|---|---|---|
| C1213AE0.6S anionic surfactant (Avg. branching: 37.84%) | 14.6 | — | — |
| Surfactant of Formula I | 5.0 | 5.0 | 25.0 |
| C12-14 alkyl sulfate | — | 14.6 | — |
| C1214 dimethyl amine oxide | 6.5 | 6.5 | 6.5 |
| Alcohol ethoxylate nonionic surfactant (Neodol 91/8) | 1.0 | 1.0 | 1.0 |
| Alkoxylated polyethyleneimine PEI600EO24PO16) | 0.2 | 0.2 | 0.2 |
| ethanol | 2.4 | 2.4 | 2.4 |
| NaCl | 0.7 | 0.7 | 0.7 |
| Polypropyleneglycol (MW2000) | 0.9 | 0.9 | 0.9 |
| Water + Minor ingredients (perfume, dye, preservatives) | Balance to 100 | Balance to 100 | Balance to 100 |

-continued

| As 100% active | Inventive Dish Formula 1 | Inventive Dish Formula 2 | Inventive Dish Formula 3 |
|---|---|---|---|
| pH (at 10% product concentration in demineralized water - with NaOH trimming) | 9.0 | 9.0 | 9.0 |

Exemplary Way to Make Surfactants of Formula I

The process of making a surfactant of Formula I can start from a mixture of Ar—COOH (II) and $R_3$—$CH_2$—COOH (III) to produce an aryl aliphatic ketone of formula IV: Ar—C(═O)—$CH_2$—$R_3$ (IV), wherein Ar and $R_3$ are defined as above and in the claims. The process further comprises the derivatization of the aryl aliphatic ketone of formula IV: Ar—C(═O)—$CH_2$—$R_3$ (IV) by means of a hydrogenation-sulfatation sequence (alternative a.) or a sulfonation-hydrogenation sequence (alternative b.) to produce the compound of formula I.

For the preparation of a compound of formula I wherein $R_1$ is $OSO_3X$ wherein X is as defined above and in the claims, $R_2$ is H, $R_3$ is a $C_6$-$C_{16}$ aliphatic group, the process is carried out according to alternative a. which involves the following steps:

a. decarboxylative cross-ketonization between Ar—COOH (II) and $R_3$—$CH_2$—COOH (III), wherein Ar and $R_3$ are as defined previously, in presence of a metal based catalyst thus obtaining an aryl aliphatic ketone of formula IV: Ar—C(═O)—$CH_2$—$R_3$ (IV), wherein Ar and $R_3$ are as defined above,
b. hydrogenation of the aryl aliphatic ketone of formula IV obtainable at step a. in presence of $H_2$ and a catalyst thus obtaining a secondary alcohol of formula V: Ar—CH(OH)—$CH_2$—$R_3$ (V), wherein Ar and $R_3$ are as defined above,
c. sulfation of the secondary alcohol of formula V obtainable at step b. with a sulfating agent followed by a neutralization with XOH or $X(OH)_2$.

For the preparation of a first compound of formula I wherein $R_1$ is OH, $R_2$ is $SO_3X$ wherein X is defined as above and in the claims, and $R_3$ is a $C_6$-$C_{16}$ aliphatic group;

or a second compound of formula I wherein $R_1$ is H, $R_2$ is $SO_3X$ wherein X is defined as above and in the claims, and $R_3$ is an aliphatic $C_6$-$C_{16}$ group;

or a mixture of the first compound and second compound of formula I, the process is carried out according to alternative b. which involves the following steps:

a. decarboxylative cross-ketonization between Ar—COOH (II) and $R_3$—$CH_2$—COOH (III), wherein Ar and $R_3$ are as defined previously, in presence of a metal based catalyst thus obtaining an aryl aliphatic ketone of formula IV: Ar—C(═O)—$CH_2$—$R_3$ (IV), wherein Ar and $R_3$ are as defined above,
b. sulfonation of the aryl aliphatic ketone of formula IV obtainable at step a. with a sulfonating agent followed by a neutralization with XOH or $X(OH)_2$ thus obtaining an aryl aliphatic ketone sulfonate of formula VI: Ar—C(═O)—CH($SO_3X$)—$R_3$ (VI) wherein Ar, X and $R_3$ are as defined above,
c. hydrogenation of the aryl aliphatic ketone sulfonate of formula VI obtainable at step b. in presence of $H_2$ and a catalyst.

Step a. Decarboxylative Cross-Ketonization

A decarboxylative cross-ketonization reaction according to step a. of the process between aryl carboxylic acid Ar—COOH (II) and aliphatic carboxylic acid $R_3$—$CH_2$—COOH (III) acid to provide aryl aliphatic ketones of formula IV: Ar—C(═O)—$CH_2$—$R_3$ (IV), wherein Ar and $R_3$ are defined as above and in the claims, forms part of both alternatives a. and b. of the process.

The starting materials Ar—COOH (II) and $R_3$—$CH_2$—COOH (III) used in the process of the present invention are either commercially available or can be synthesized by the skilled person in view of his/her common general knowledge.

The decarboxylative cross-ketonization is preferably carried out as catalytic decarboxylative cross-ketonization. Such a procedure is known from WO 2018/229285 A1 (see e.g. page 4, lines 9-34 of WO 2018/229285 A1). The catalytic decarboxylative cross-ketonization of aryl- and aliphatic carboxylic acids as described in detail in WO 2018/229285 A1 can be analogously applied in the context herein in order to provide aryl aliphatic ketones of formula IV:

$$Ar—C(═O)—CH_2—R_3 \quad (IV).$$

The skilled person in view of his/her common general knowledge is also able to modify a decarboxylative cross-ketonization procedure applied in the art for the purpose of the process, if necessary.

Alternative a.: Steps b. and c. Hydrogenation-Sulfatation-Neutralization

In the following, the hydrogenation-sulfatation sequence according to steps b. and c. of alternative a. of the process will be further described.

Step b. of alternative a.: In the process according to alternative a., the aryl aliphatic ketone of formula IV: Ar—C(═O)—$CH_2$—$R_3$ (IV) is hydrogenated in the presence of $H_2$ and a catalyst, thereby obtaining a secondary alcohol of formula V: Ar—CH(OH)—$CH_2$—$R_3$ (V), wherein Ar and $R_3$ are as defined above and in the claims.

The catalytic hydrogenation of aryl aliphatic ketones in order to obtain the corresponding aryl aliphatic alcohol is a standard reaction commonly known to the skilled person.

In the process, the hydrogenation step is carried out in the presence of a metal based catalyst, preferably a transition metal based catalyst, which is typically palladium on charcoal (Pd/C).

In the process, the hydrogenation step can be carried out in a reactor/autoclave with hydrogen gas ($H_2$)-pressures up to 100 bar (such as e.g. 80 bar, 60 bar, 40 bar or 20 bar) at temperatures up to 150° C., preferably up to 100° C., such as e.g. 90° C.

The catalytic hydrogenation can be carried out in solution using an additional solvent. In that case, the skilled person in view of his/her common general knowledge is able to choose a suitable solvent from the range of standard solvents widely used in organic synthesis. As examples of typical solvents used in catalytic hydrogen reaction one can mention for example: methanol, ethanol, isopropanol, tert-butanol, THF, Me-THF, saturated hydrocarbons, or their mixtures.

The reaction can also be carried out without using a solvent. In that case, the catalytic hydrogenation is typically carried out at temperature where the substrate is present in melted form.

The skilled person in view of his/her common general knowledge is able to control the progress of the reaction using standard techniques, such as NMR.

The skilled person in view of his/her common general knowledge is able to purify the product mixture resulting from the hydrogenation step using common purification and separation techniques, such as distillation methods, precipitation/crystallization methods (if applicable), and chromatographic methods (including e.g. flash chromatography and HPLC).

A procedure for the catalytic hydrogenation of aryl aliphatic ketones is e.g. described in US 2020/0339748 A1 (cf. paragraphs [0265]-[0270] of US 2020/0339748 A1) which can be analogously applied in the process herein. In this preferred protocol, the reaction is conducted without any solvent and a sub-stoichiometric amount of an alkali (e.g. NaOH) is used as an additive in order to enhance the hydrogenation selectivity toward the desired benzylic alcohol derivative.

The skilled person in view of his/her common general knowledge is also able to modify an aryl aliphatic ketone hydrogenation procedure applied in the art for the purpose of the present invention, if necessary.

Step c. of alternative a.: The secondary alcohol of formula V: Ar—CH(OH)—$CH_2$—$R_3$ (V) wherein Ar and $R_3$ are as defined above and in the claims obtainable from step b. is then submitted to a sulfatation step with a sulfating agent, said sulfatation being followed by a neutralization with a base XOH or X($OH_2$), thereby obtaining the compound of formula I wherein $R_1$ is $OSO_3X$ wherein X is as defined above and in the claims, $R_2$ is H, and $R_3$ is a $C_2$-$C_{26}$ aliphatic group.

The sulfatation of secondary alcohols is a standard reaction that forms part of the common general knowledge of the skilled person.

In the context of the process, the sulfatation of secondary alcohols of formula V: Ar—CH(OH)—$CH_2$—$R_3$ (V) can be carried out using known sulfating agents. Sulfating agents useful in the present invention are e.g. selected from the group consisting of $SO_3$, chlorosulfonic acid ($ClSO_3H$), oleum and sulfamic acid ($H_3NSO_3$). Preferably, $SO_3$ or chlorosulfonic acid ($ClSO_3H$) are used as the sulfating agents in the process of the present invention.

The sulfatation can be carried out in solution. The skilled person in view of his/her common general knowledge is able to choose a suitable solvent from the range of standard solvents widely used in organic synthesis, including, but not limited to, e.g. $CH_2Cl_2$, $CHCl_3$, $CCl_4$, pyridine, ethyl acetate, dioxane, diglyme, THF, 2-methyl-THF, hydrocarbons or mixtures thereof.

Alternatively, the sulfatation can be carried out without any solvent when the alcohol is in its melted state.

The sulfatation step can be conducted at temperatures ranging from −20° C. to 120° C., preferably 0° C. to 80° C. Due to the exothermic nature of the reaction, the sulfatation agent is typically added at lower temperatures (e.g. within the range of −20° C. to 10° C.) to the substrate.

The temperature is then typically increased in order to accelerate the reaction and increase conversion. In the case when $SO_3$ is used as a sulfating agent, the sulfatation can be carried out with gaseous $SO_3$ diluted in dry air or dry nitrogen (for example 1 to 5% v/v) using for example a so called falling film reactor.

The skilled person in view of his/her common general knowledge is able to control the progress of the sulfatation reaction using standard techniques, such as NMR.

An ageing step can optionally be included after the sulfatation step in order to achieve full conversion to the sulfonic acid. Such ageing step can e.g. be conducted at a temperature between 15° C. to 200° C.

The sulfatation step is followed by a neutralization step order to complete salt formation of the desired product, i.e. the compound of formula (I).

The neutralization can be carried out using a base compound of the general formula XOH or $X(OH)_2$, wherein X is an alkali metal, an alkali-earth metal, or an ammonium group as defined above. X can e.g. be Li, Na, K, Cs, $NH_4$, triethanolammonium, Mg or Ca.

The neutralization using the base compound of the general formula XOH or $X(OH)_2$ is typically carried out in aqueous solution (or in a solvent mixture to which an aqueous solution of the base compound of the general formula XOH or $X(OH)_2$ is added). The neutralization is typically carried out at temperatures within the range from 0° C. to 100° C., preferably at temperatures within the range from 0° C. to room temperature. "Room temperature" for the purpose of the process is defined herein as ranging from 20° C. to 30° C.

The skilled person in view of his/her common general knowledge is able to purify the product mixture resulting from the sulfatation and subsequent neutralization step using common purification and separation techniques, such as distillation methods, precipitation/crystallization methods (if applicable), and chromatographic methods (including e.g. flash chromatography and HPLC).

The skilled person in view of his/her common general knowledge is also able to modify a sulfatation procedure applied in the art for the purpose of the process, if necessary.

Alternative b.: Steps b. and c. Sulfonation-Hydrogenation-Neutralization

In the following, the sulfonation-hydrogenation sequence according to steps b. and c. of alternative b. of the process will be further described.

Step b. of alternative b.: In the process according to alternative b., the aryl aliphatic ketone of formula IV: Ar—C(═O)—$CH_2$—$R_3$ (IV) obtained from the decarboxylative cross-ketonization step is sulfonated with a sulfonating agent followed by a neutralization with a base XOH or $X(OH)_2$, thereby obtaining an aryl aliphatic ketone sulfonate of formula VI: Ar—C(═O)—CH($SO_3X$)—$R_3$ (VI) wherein Ar, X and $R_3$ are as defined above and in the claims.

The sulfonation of aryl aliphatic ketones using a sulfonating agent is known to the skilled person, and e.g. described in WO 2018/229285 A1 (cf. page 43, lines 5-22). Step b. of alternative b. in the process can be carried out in accordance with said known procedure as described WO 2018/229285 A1.

In accordance with the known procedure from WO 2018/229285 A1, the sulfonation step in the process can be conducted using e.g. gaseous $SO_3$ as the sulfonating agent, preferably diluted in dry air or dry nitrogen (for example 1 to 5% v/v). In this case, the sulfonation using diluted $SO_3$ can be performed using a so called falling film reactor. Other sulfonating agents useful herein include chlorosulfonic acid ($ClSO_3H$), oleum and sulfamic acid ($H_3NSO_3$). Preferably $SO_3$ or chlorosulfonic acid ($ClSO_3H$) is used as the sulfonating agent.

The reaction is typically conducted at temperatures ranging from −20° C. to 200° C., preferably ranging from 0° C. to 120° C. Due to the exothermic nature of the reaction, the sulfonation agent is typically added at lower temperatures (e.g. within the range of −20° C. to 10° C.) to the substrate. After the addition is completed, the temperature is typically increased in order to accelerate the reaction and increase conversion.

The sulfonation can be carried out in solution or neat. The skilled person in view of his/her common general knowledge is able to choose a suitable solvent from the range of standard solvents widely used in organic synthesis, including, but not limited to, e.g. $CH_2Cl_2$, $CHCl_3$, $CCl_4$, pyridine, ethyl acetate, dioxane, diglyme, THF, 2-methyl-THF, hydrocarbons or mixtures thereof.

The skilled person in view of his/her common general knowledge is able to control the progress of the sulfonation reaction using standard techniques, such as NMR.

An ageing step can optionally be included after the sulfonation step in order to achieve full conversion to the sulfonic acid. Such ageing step can e.g. be conducted at a temperature between 15° C. to 200° C.

The sulfonating step is followed by a neutralization step in order to order to complete salt formation of the desired product, i.e. aryl aliphatic ketone sulfonate of formula VI: Ar—C(═O)—CH($SO_3X$)—$R_3$ (VI).

The neutralization can be carried out as already described above in connection with step c. of alternative a. of the process of the present invention.

The skilled person in view of his/her common general knowledge is able to purify the product mixture resulting from the sulfonation and subsequent neutralization step using common purification and separation techniques, such as distillation methods, precipitation/crystallization methods (if applicable), and chromatographic methods (including e.g. flash chromatography and HPLC).

The skilled person in view of his/her common general knowledge is also able to modify a sulfonation procedure applied in the art for the purpose of the present invention, if necessary.

Step c. of alternative b.: The aryl aliphatic ketone sulfonate of formula VI: Ar—C(═O)—CH($SO_3X$)—$R_3$ (VI) wherein Ar, X and $R_3$ are as defined above and in the claims, can be subsequently submitted to a hydrogenation step in the presence of $H_2$ and a catalyst, thereby obtaining a first compound of formula I, wherein $R_1$ is OH, $R_2$ is $SO_3X$ wherein X is as defined above, $R_3$ is a $C_6$-$C_{16}$ aliphatic group; or a second compound of formula I wherein $R_1$ is H, $R_2$ is $SO_3X$ wherein X is as defined above and in the claims, $R_3$ is a $C_6$-$C_{16}$ aliphatic group; or a mixture of said first compound and said second compound of formula I.

The catalytic hydrogenation of aryl aliphatic ketones in order to obtain the corresponding aryl aliphatic alcohol is a standard reaction commonly known to the skilled person.

In the context of step c. of alternative b., the catalytic hydrogenation can analogously be carried out as described above in connection with step b. of alternative a. of the process.

The skilled person in view of his/her common general knowledge is also able to tune the hydrogenation conditions in favor of obtaining the first compound of formula I and reducing the amount of the second compound of formula I formed or alternatively in favor of the second compound of formula I and reducing the amount of the first compound of formula I. The skilled person in view of his/her common general knowledge is able to control the progress of the reaction using standard techniques, such as NMR.

The skilled person in view of his/her common general knowledge furthermore is able to purify the product mixture resulting from the hydrogenation step using common purification and separation techniques, such as distillation methods, precipitation/crystallization methods (if applicable), and chromatographic methods (including e.g. flash chromatography and HPLC).

Combinations

1. A fabric and home care product comprising a surfactant of formula I (I)

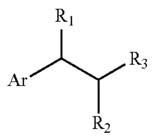

wherein Ar represents an aryl group;

$R_1$ is H or a group of formula OR wherein R is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

$R_2$ is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

with the proviso that $R_1$ and $R_2$ are different groups when $R_2$is $SO_3X$, $R_1$ is H or OR with R is H when $R_2$ is H, $R_1$ is OR with R is $SO_3X$ $R_3$ is a $C_6$-$C_{16}$ aliphatic group.

2. The fabric and home care product of paragraph 1, wherein Ar is a phenyl group.

3. The fabric and home care product of any of paragraphs 1 or 2, wherein X is sodium.

4. The fabric and home care product of any of paragraphs 1 to 3, wherein $R_1$ is $OSO_3X$ and $R_2$ is H.

5. The fabric and home care product of any of paragraphs 1 to 3, wherein $R_1$ is OH $R_2$ is $SO_3X$.

6. The fabric and home care product of any of paragraphs 1 to 3, wherein $R_1$ is H and $R_2$ is $SO_3X$.

7. The fabric and home care product of any of paragraphs 1 to 6, wherein $R_3$ is a $C_{10}$-$C_{16}$ aliphatic group.

8. The fabric and home care product of any of paragraphs 1 to 6, wherein $R_3$ is a $C_{14}$-$C_{16}$ aliphatic group.

9. The fabric and home care product of any of paragraphs 1 to 8, wherein the product is hard surface cleaner, a laundry detergent, air freshener, dish washing detergent, fabric conditioner, hard surface cleaner, laundry additive, rinse additive, or a combination thereof.

10. The fabric and home care product of any of paragraphs 1 to 9, wherein the product comprises from about 5% to about 65% by weight of the product, of the surfactant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric and home care product comprising a surfactant of formula I (I)

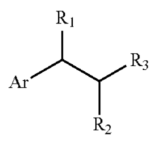

wherein Ar represents an aryl group; wherein Ar represents a substituted phenyl group of the following formula:

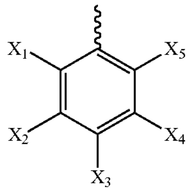

wherein $X_1$, $X_2$, $X_3$, $X_4$ and $X_5$ which can be the same or different represent a constituent selected from the group consisting of:

hydrogen or a $C_1$-$C_{24}$ linear or branched hydrocarbon group having 1 to 24 carbon atoms, hydroxy (—OH) or alkoxy group (—OR) wherein R is a linear or branched hydrocarbon group having 1 to 24 carbon atoms which can be optionally substituted and/or interrupted by one or more heteroatoms or heteroatom containing groups, amino group (—NRR') wherein R and R' independently represent hydrogen or a linear or branched hydrocarbon group having 1 to 24 carbon atoms which can be optionally substituted and/or interrupted by one or more heteroatoms or heteroatom containing groups, acyl group (—(C═O)—R) wherein R represents hydrogen or a $C_1$-$C_{24}$ linear or branched hydrocarbon group having 1 to 24 carbon atoms which can be optionally substituted and/or interrupted by one or more heteroatoms or heteroatom containing groups, carboxyl (—COOH) or alkoxycarbonyl group (—(C═O)—OR) wherein R represents a $C_1$-$C_{24}$ linear or branched hydrocarbon group having 1 to 24 carbon atoms which can be optionally substituted and/or interrupted by one or more heteroatoms or heteroatom containing groups, carbamoyl group (—(C═O)—NRR') wherein R and R' independently represent hydrogen or a linear or branched hydrocarbon group having 1 to 24 carbon atoms which can be optionally substituted and/or interrupted by one or more heteroatoms or heteroatom containing groups, alkylsulfonyl group (—$SO_2$—R) or alkylsulfinyl group (—SO—R) or alkylthio group (—S—R) wherein R represents a $C_1$-$C_{24}$ linear or branched hydrocarbon group having 1 to 24 carbon atoms which can be optionally substituted and/or interrupted by one or more heteroatoms or heteroatom containing groups;

wherein $R_1$ is H or a group of formula OR wherein R is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

$R_2$ is H or $SO_3X$ wherein X is an alkali metal, alkali-earth metal or ammonium of general formula R'R"R'"R""N wherein R', R", R'" and R"" are independently chosen from hydrogen or a hydrocarbyl group which can be optionally substituted and/or interrupted by one or more heteroatom containing groups;

with the proviso that $R_1$ and $R_2$ are different groups when $R_2$is $SO_3X$, $R_1$ is H or OR with R is H when $R_2$ is H, $R_1$ is OR with R is $SO_3X$ $R_3$ is a $C_6$-$C_{16}$ aliphatic group, wherein the fabric and home care product is a hard surface cleaner, a laundry detergent, air freshener, dish washing detergent, fabric conditioner, hard surface cleaner, laundry additive, rinse additive, or a combination thereof;

wherein the surfactant of Formula I comprises of biodegradable components according to the OECD 301B test protocol (OECD (1992), Test No. 301: Ready Biodegradability, OECD Guidelines for the Testing of Chemicals, Section 3, OECD Publishing, Paris).

2. The fabric and home care product of claim 1, wherein X is sodium.

3. The fabric and home care product of claim 1, wherein $R_1$ is $OSO_3X$ and $R_2$ is H.

4. The fabric and home care product of claim 1, wherein $R_3$ is a $C_{10}$-$C_{16}$ aliphatic group.

5. The fabric and home care product of claim 1, wherein $R_3$ is a $C_{14}$-$C_{16}$ aliphatic group.

6. The fabric and home care product of claim 1, wherein the product comprises from about 5% to about 65% by weight of the product, of the surfactant.

* * * * *